(12) United States Patent  (10) Patent No.: US 10,506,893 B2
Thakkar  (45) Date of Patent: Dec. 17, 2019

(54) CHAI TEA BREWER

(71) Applicant: InnovaHive Product Development Inc., New Westminster (CA)

(72) Inventor: Viral Thakkar, Burnaby (CA)

(73) Assignee: InnovaHive Product Development Inc., New Westminster (CA)

( * ) Notice: Subject to any disclaimer, the term of this patent is extended or adjusted under 35 U.S.C. 154(b) by 352 days.

(21) Appl. No.: 15/139,748

(22) Filed: Apr. 27, 2016

(65) Prior Publication Data

US 2016/0316962 A1  Nov. 3, 2016

Related U.S. Application Data

(60) Provisional application No. 62/153,518, filed on Apr. 28, 2015.

(51) Int. Cl.
*A47J 31/56* (2006.01)
*A23F 3/18* (2006.01)

(52) U.S. Cl.
CPC .......... *A47J 31/56* (2013.01); *A23F 3/18* (2013.01)

(58) Field of Classification Search
CPC ........ A47J 31/4485; A47J 31/56; A47J 31/52; A47J 31/007; A47J 31/002; A47J 31/401; A47J 31/41; A47J 31/467; A47J 31/54; A47J 31/24; A47J 31/36; A47J 31/402; A47J 31/404; A47J 31/40; A47J 31/405; A47J 31/46; A47J 31/545; A47J 31/057; A47J 31/0573; A47J 31/0615; A47J 31/103; A47J 31/18; A47J 31/30; A47J 31/34;

(Continued)

(56) References Cited

U.S. PATENT DOCUMENTS 5,408,917 A * 4/1995 Lussi .................... A47J 31/007
219/428
5,584,229 A * 12/1996 Anson ................... A47J 31/002
99/280

(Continued)

OTHER PUBLICATIONS

Jose Genoves Design & Innovation, "Philips Chai-Tea maker" retrieved from the Internet URL: http://josegenoves.com/PHILLIPS-Chai-Tea-maker, on Apr. 26, 2016.

(Continued)

*Primary Examiner* — Ibrahime A Abraham
*Assistant Examiner* — Chris Q Liu
(74) *Attorney, Agent, or Firm* — Bookoff McAndrews, PLLC

(57) ABSTRACT

An automatic tea brewing system may include a first container configured to hold a first liquid; a second container configured to hold a second liquid; a brew pot configured to be fluidly coupled to the first container and to the second container; a heating element; and a controller programmed to dispense the first liquid from the first container to the brew pot at a first time, heat the first liquid in the brew pot to a first temperature, dispense the second liquid from the second container to the brew pot at a second time later than the first time to produce a liquid combination in the brew pot, heat the liquid combination in the brew pot to a second temperature, and, at a third time later than the second time, begin decreasing the temperature of the liquid combination.

15 Claims, 7 Drawing Sheets

(58) Field of Classification Search
CPC .. A47J 31/3666; A47J 31/3671; A47J 31/407; A47J 31/42; A47J 31/4489; A47J 31/462; A47J 31/465
USPC ...... 99/281, 293, 323.1, 286, 280, 283, 290, 99/299, 323.3, 285, 287, 295, 307, 453, 99/275, 279, 282, 291, 294, 300, 302 R, 99/305, 309, 323, 452, 485; 426/569, 426/231, 431, 433, 474, 511, 520, 522, 426/590, 594, 595, 596
See application file for complete search history.

(56) References Cited

U.S. PATENT DOCUMENTS

| | | | | |
|---|---|---|---|---|
| 5,694,115 | A * | 12/1997 | Desatoff | A47J 31/44 307/140 |
| 6,019,028 | A * | 2/2000 | Schmed | A47J 31/0573 99/290 |
| 2007/0199452 | A1* | 8/2007 | Dworzak | A47J 31/32 99/275 |
| 2009/0158937 | A1* | 6/2009 | Stearns | A47J 31/41 99/280 |
| 2010/0203209 | A1* | 8/2010 | Fishbein | A47J 31/18 426/433 |
| 2011/0168026 | A1* | 7/2011 | Cahen | A47J 31/4407 99/280 |
| 2015/0128814 | A1 | 5/2015 | Chawla | |

OTHER PUBLICATIONS

"Meet Chime," retrieved from the Internet URL: http://www.brewchime.com, on Apr. 26, 2016.

* cited by examiner

CHAI TEA BREWER

CROSS REFERENCE TO RELATED APPLICATION

This application claims priority to U.S. Provisional Application No. 62/153,518, filed Apr. 28, 2015, the entirety of which is incorporated by reference herein.

TECHNICAL FIELD

Exemplary embodiments of the present disclosure relate to a system and a method for quickly, conveniently, and automatically brewing tea.

BACKGROUND

Chai tea is a flavored tea beverage made by brewing black tea with a mixture of aromatic spices and herbs. Originating in India, the beverage has gained worldwide popularity.

There is no single, recognized recipe or preparation method for chai tea, and many families have their own versions of the tea. The tea leaves steep in the hot water long enough to extract intense flavour, ideally without releasing bitter tannins. Because of the large range of possible variations, chai can be considered a class of tea rather than a specific kind. However, chai generally, in examples, has four basic components, tea base (usually a strong black tea), spices (usually a mixture of one or more of the following examples: ground ginger, cardamom, cinnamon, star anise, fennel seed, peppercorn, nutmeg, and cloves), milk, and sweetener (examples: plain white sugar, brown sugar, honey, jaggery).

The traditional method of preparing chai tea is through decoction, by actively simmering or boiling a mixture of milk and water with loose leaf tea, sweeteners and spices. The solid tea and spice residues are strained off from chai tea before serving. Chai brewing is considered to be an art form, and the color, smell and taste of chai are emphasized. Brewing chai tea typically involves the right amount of tea leaves, water, milk, and spices, the right temperature and amount of time, and the sequence and timing of adding ingredients to the brew pot. If the tea leaves soak in the water too long, the chai tea becomes astringent.

SUMMARY

In examples, this disclosure provides an automatic chai tea brewing system and method for making traditional chai tea efficiently, quickly, and easily. Each of the embodiments disclosed herein may include one or more of the features described in connection with any of the other disclosed embodiments.

In one example, an apparatus may include three containers: one for water, one for milk or cream, and one brew pot. As used herein, the term "milk" may include any dairy product (including cream, lactose-free milk, etc.) or imitation dairy product (e.g., soy-based, almond-based, etc.) suitable for use in making tea. The mixture of spices, tea base and sweetener may be placed in the brew pot directly or in a mesh filter enclosure. In one example, the base of the milk and water containers may be inclined or curved to facilitate complete drainage of the content. The containers may have a check valve and a small liquid discharge hole at the lower end. The check valve at the drain hole may prevent leaking of the liquid. The milk and water containers may be easily detachable for ease of refill. The containers also may feature lids and can be easily stored in the refrigerator when not attached to apparatus. The brew pot may be placed on a heating element, and the surface that contacts the heating element may be made of thermal conductive material. The other surfaces can have thermal insulation for safety and to preserve heat within the brew pot. In one example, the brew pot may include an integrated heating element at the bottom.

The apparatus may include precise dispensing mechanisms for milk and water. In one of the embodiments, the containers for water and milk may be positioned at a higher hydraulic head than the brew pot. Valves may control the flow of water and milk, under the force of gravity, into the brew pot. In another embodiment, a gas pump may pressurize either the water or milk containers so as to allow fluid displacement into the brew pot. By controlling the air pressure within the containers, the dispensing of liquids can be controlled. In another embodiment, a fluid pump and valves may be used to control the dispensing of milk or water into the brew pot. The quantity of the liquid dispensed can be controlled by using a liquid level sensor (e.g., electro-mechanical, optical, ultrasound, load cell) or a flowmeter, or a combination of both.

The apparatus may also include a controller that receives data from the sensors, which may include, but are not limited to, a liquid level sensor, flow meter, pressure sensor, and temperature sensor. The controller may also receive data from user input buttons, and the controller may control the operation of the heating element and dispensing mechanisms. The user may input preferred parameters, like the relative amounts of water and milk (e.g., water:milk ratio or milk:water ratio) and number of cups, to the apparatus using the user input buttons. The user inputs are not limited to these two examples; more buttons can be added for additional user inputs or one button can be used to input more than one parameter. Non-limiting examples of potential user inputs to the apparatus include: intensity of tea, time delay or a time to start the brewing process, time to keep the chai warm or hot after the brewing process is complete, desired serving temperature, reset settings, start brew, switch on/off machine, etc. A touch screen can be used for user input instead of buttons. A screen may display the relevant information on the apparatus like programmed parameters, current status, etc. A level sensor may be added to the brew pot to detect frothing of chai, and the controller may be programmed to reduce the temperature of the heating coil immediately or soon thereafter. This feature may prevent overflow. The controller can further have a parameter to allow the user to configure the number of rise/fall cycles.

In one embodiment, a mesh filter may be located at the brew discharge hole. The mesh filter may be made of conventional materials with a tiny mesh or fine screen. The mesh filter can be basket-shaped, cylindrical, spherical or oval. The filter may be inserted inside the brew pot or it can be rested on a brew pot (e.g., on the top rim) with the basket extending inside the brew pot. The mesh filter can be non-removable, or it can be easily removed by fingers or by dumping it out from the top of the tea brewer. Alternatively, the mesh filter can be a flat or slightly concave shaped disk and rest inside the lower portion of the brew pot.

In one embodiment, a stirrer may be used to mix the liquid mixture constantly or intermittently, as required. The stirrer may be controlled by the controller. A lid can be added to the brew pot. The lid may be shaped and sized to fit on top of the brew pot and, additionally, may have apertures for one or more liquid inlets.

Using the above systems, making high quality chai becomes easy, efficient, and automatic. The water and milk may be placed in the respective containers, and the containers may be attached to the apparatus. The desired amount of tea leaves, spices and sweeteners may be added to the brew pot directly, inside a mesh filter basket, or in a pre-mixed tea bag that may include spices and/or sweeteners. The user may program the apparatus for the parameters of chai desired; non-limiting examples of programmed parameters include: water to milk ratio, intensity of tea, serving temperature, and amount of the chai to prepare. Once the user has inputted the parameters, the system may automatically brew chai with the desired, programmed amount of brewing time, water to milk ratio, and quantity. The system also may allow a desired combination of parameter settings to be saved in a profile, eliminating the need to remember the parameters. Accordingly, the system may be programmed (e.g., to initiate brewing) using single click. The system can be connected to a wireless communications network, such as the internet, and can be operated remotely using smart phones or any other communicative computing device allowing users to start the chai preparation remotely. Other examples of wireless communication technologies that allow the system to be operated remotely include Bluetooth or WiFi technology.

In at least some examples, a system and method for making Chai tea according to this disclosure may make tea with a desired amount of brewing time.

In at least some examples, a system and method for making Chai tea according to this disclosure may make tea with a desired amount of water, milk, and relative amounts of water and milk.

In at least some examples, a system for making traditional Chai tea according to this disclosure may eliminate the need to monitor the brewing time and the need to pour water and milk into a brew pot at exact times.

In at least some examples, a system for making traditional Chai tea according to this disclosure may result in the brewed chai tea naturally being separated from the mixture of soaked tea leaves and spices.

In at least some examples, a system for making traditional Chai tea according to this disclosure may allow ingredients to be easily stored when not in use.

In at least some examples, a system for making traditional Chai tea according to this disclosure may be easy to use and easy to clean.

In one example, an automatic tea brewing system may include a first container configured to hold a first liquid; a second container configured to hold a second liquid; a brew pot configured to be fluidly coupled to the first container and to the second container; a heating element; and a controller programmed to dispense the first liquid from the first container to the brew pot at a first time, heat the first liquid in the brew pot to a first temperature, dispense the second liquid from the second container to the brew pot at a second time later than the first time to produce a liquid combination in the brew pot, heat the liquid combination in the brew pot to a second temperature, and, at a third time later than the second time, begin decreasing the temperature of the liquid combination.

The system may additionally or alternatively include one or more of the following features: a bottom face of each of the first and second containers may include a drain hole and at least one of an incline or a curvature to facilitate draining of liquid through the drain hole; the interval between the first time and the second time may be larger than the interval between the second time and the third time; the first liquid may be water and the second liquid may be milk, and the controller may be configured to receive a user input defining a relationship between the amounts of water and milk, and the controller may be configured to brew tea based on the defined relationship; the system does not require an operator to dispense the first and second liquids into the brew pot during a brewing process; the system may further comprise a partially permeable material to separate tea leaves from the liquid combination; the system may include a pump to dispense the first and second liquids into the brew pot; the system may further comprise at least one liquid level sensor to measure a quantity of one or both of the first liquid dispensed and the second liquid dispensed; the system may further comprise at least one flow sensor to measure a quantity of one or both of the first liquid dispensed and the second liquid dispensed; the heating element may be integrated with the brew pot; the system may further comprise an automatic stirrer; the system may be configured to store a profile that includes a combination of user parameters; and the system may be configured to be operated remotely via a wireless communication network.

In another example, a method for brewing tea may include adding water to a first container; adding milk to a second container; adding a mixture of spices and tea base to a third container; and activating a controller to: dispense the water from the first container into the third container at a first time, heat the water to a first temperature, dispense the milk from the second container into the third container at a second time later than the first time to form a tea mixture, heat the tea mixture to a second temperature, and at a third time later than the second time, begin decreasing the temperature of the tea mixture towards a desired end temperature.

The method may additionally or alternatively include one or more of the following features or steps: the method may further comprise the controller receiving at least one user input; the at least one user input may include a desired intensity of tea, and the controller may select the second time and the third time based on the desired intensity; the at least one user input may include a quantity of tea to be brewed; the at least one user input may include at least one of a time delay to start dispensing the water from the first container or a time of day to start dispensing the water from the first container; the at least one user input may include the desired end temperature and a length of time to keep the tea mixture at the desired end temperature; and the second temperature may be less than the first temperature, and the desired end temperature may be less than the second temperature.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Reference will now be made in detail to examples of the present disclosure, which are illustrated in the accompanying drawings. Wherever possible, the same reference numbers will be used throughout the drawings to refer to the same or like parts.

As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

Embodiment 1

Figure 1:
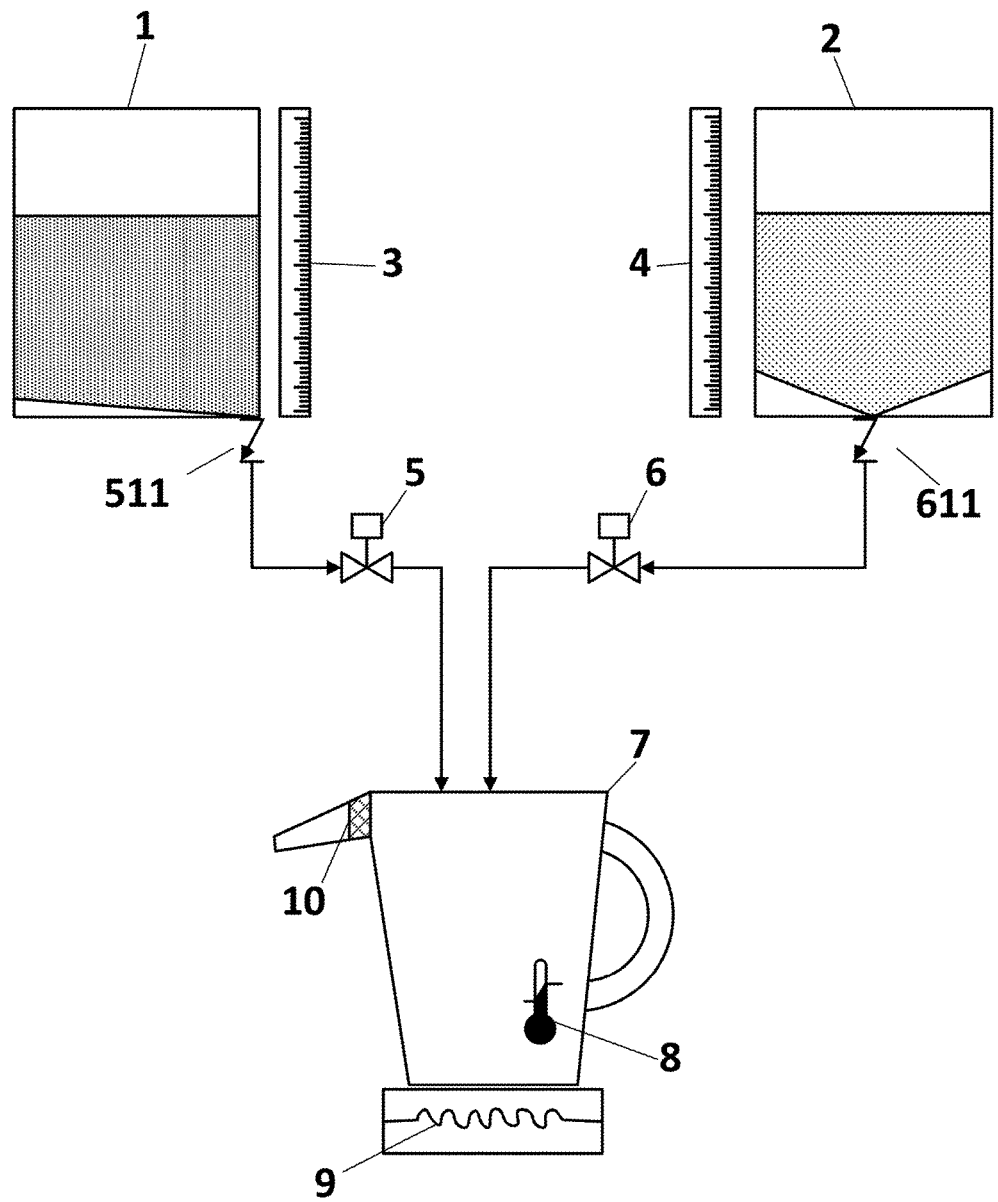
FIG. 1 shows an abridged general view of the structure of a liquid circuit of a first embodiment of a chai brewing system, according to this disclosure.

The structure of the liquid circuit of a first embodiment of a chai brewing apparatus is shown in FIG. 1, wherein the trend of water and milk flow is shown with arrows. A water container 2, a milk container 1, a water level sensor 4, a milk level sensor 3, a heating element 9, a brew pot 7, and a water-milk output switching mechanism may be arranged in the shell of the chai brewing apparatus. For example, all of these components may be included in a container made of any suitable material, with the capability of accessing any of the internal components shown in FIG. 1. The water-milk output switching mechanism may include a first valve 5 and a second valve 6 to control the flow of milk and water from milk container 1 and water container 2, respectively.

Each of the water container 2 and milk container 1 may have non-flat bottoms for easily draining the fluid completely, which may reduce the waste of ingredients. For example, the bottoms of the containers may include an incline, with a check valve located adjacent the lowest point of the incline. In other examples, the bottoms may include a curved surface. Each container may have a check valve 511, 611 and a small liquid discharge hole at the lower end. Milk container 1 may be connected to the first valve 5, and water container 2 may be connected to second valve 6. The first valve 5 and second valve 6 both may be connected to the inlet to brew pot 7. The discharge hole for water and milk containers may be placed at a higher hydraulic head than the brew pot 7. This may allow the liquid to flow into the brew pot 7 under gravitational force.

The brew pot 7 can be made of any commonly used utensil material like stainless steel, aluminum, and/or glass. The surface in contact with the heating element 9 can be made of a material that has higher thermal conductivity for increased efficiency. The other surfaces can be insulated inside to preserve the heat within the brew pot 7 and to keep the external surface at a lower temperature for safety. A temperature sensor 8 may be placed within brew pot 7 or in the internal surface of brew pot 7 to measure the temperature of liquid during or after the brewing process. Alternatively, temperature sensor 8 can be placed on the heating element 9, and the temperature of the liquid within brew pot 7 can be calculated indirectly by a controller.

A mesh filter 10 may be attached at the exit of brew pot 7. Mesh filter 10 may filter the chai from the tea leaves and the spices. Mesh filter 10 may be made of conventional materials with a tiny mesh or fine screen. Mesh filter 10 can be non-removable, or it can be easily removed by fingers for cleaning.

Figure 2:
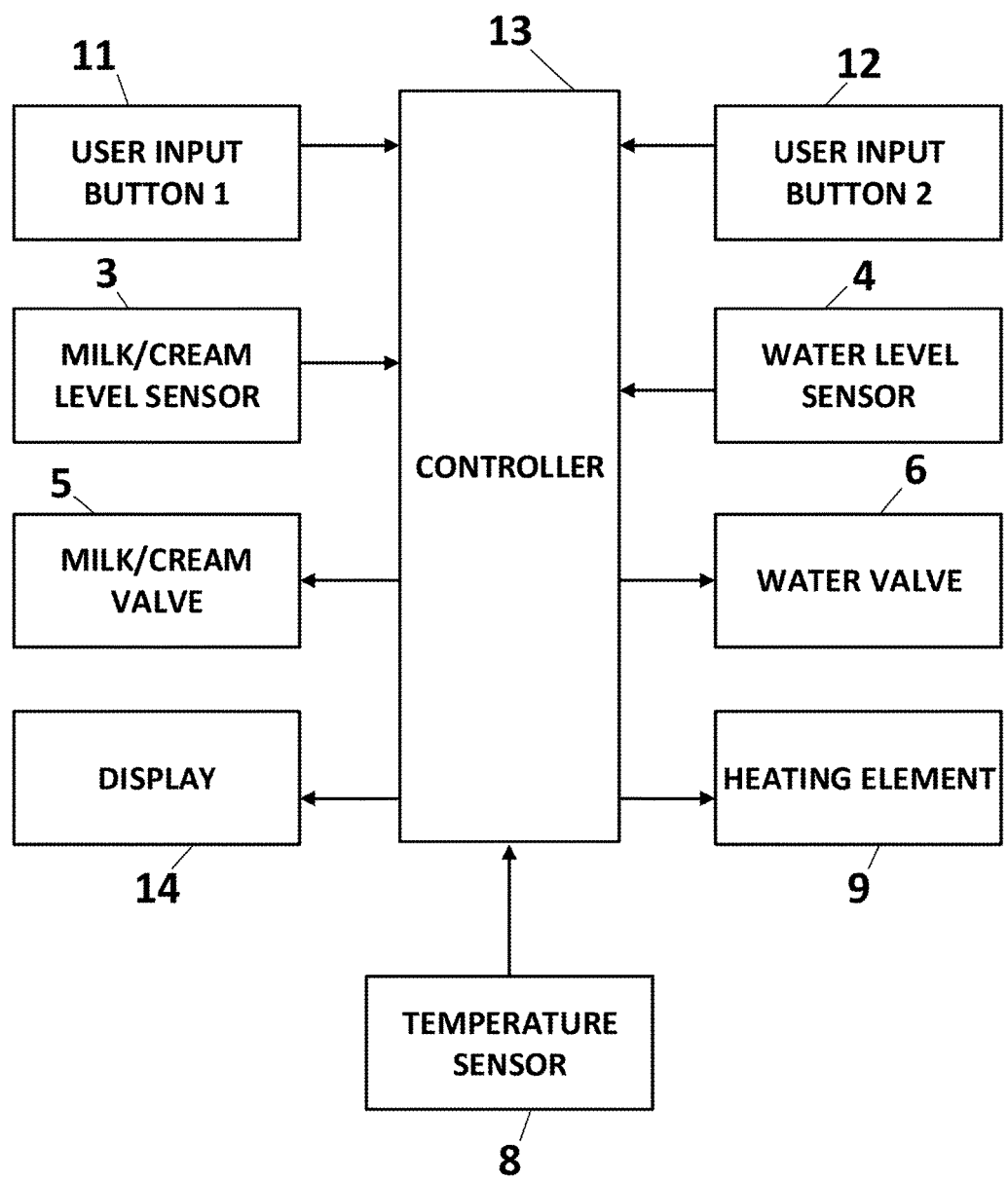
FIG. 2 shows an abridged general view of a circuit box structure of the embodiment of FIG. 1.

The circuit box structure of the FIG. 1 embodiment is shown in FIG. 2: the data collection ports of the controller 13 may accept the water level signal from the water level sensor 4, the milk level signal from the milk level sensor 3, the liquid temperature signal of the brew pot from the temperature sensor 8, and the user inputs from the User Input buttons 11, 12. The control input of the controller may accept additional user inputs from additional buttons and/or user interfaces. The control output ports of the controller 13 may control the water valve 6, milk valve 5, heating element 9, and display 14.

The controller 13 may accept the following non-limiting exemplary user inputs: relative amounts of water and milk (e.g., milk:water ratio/water:milk ratio), quantity of tea to brew, intensity of chai to be brewed, time or time delay to start the brewing process, and/or time (e.g., duration) to keep the chai warm/hot after the brewing process is complete. Controller 13 may open the water valve 6 at a programmed time to dispense a desired quantity of the water into the brew pot 7, and then may activate heating element 9. The temperature and time may be carefully monitored. The controller 13 may calculate the time (e.g., duration) of the water-dispensing step based on the user input for intensity, as with increased time of decoction the intensity of chai becomes stronger. Controller 13 then may open the milk valve 5 to dispense a desired amount of milk into brew pot 7. The temperature and time (e.g., duration) of this step of the process also may be important for the intensity of the chai. The controller 13 then may maintain the temperature of the chai for the duration as programmed by the user.

The status of the process and programmed parameters may be displayed on the apparatus via a display 14. Additionally or alternatively, light indicators can be used to display this information.

Embodiment 2

Figure 3:
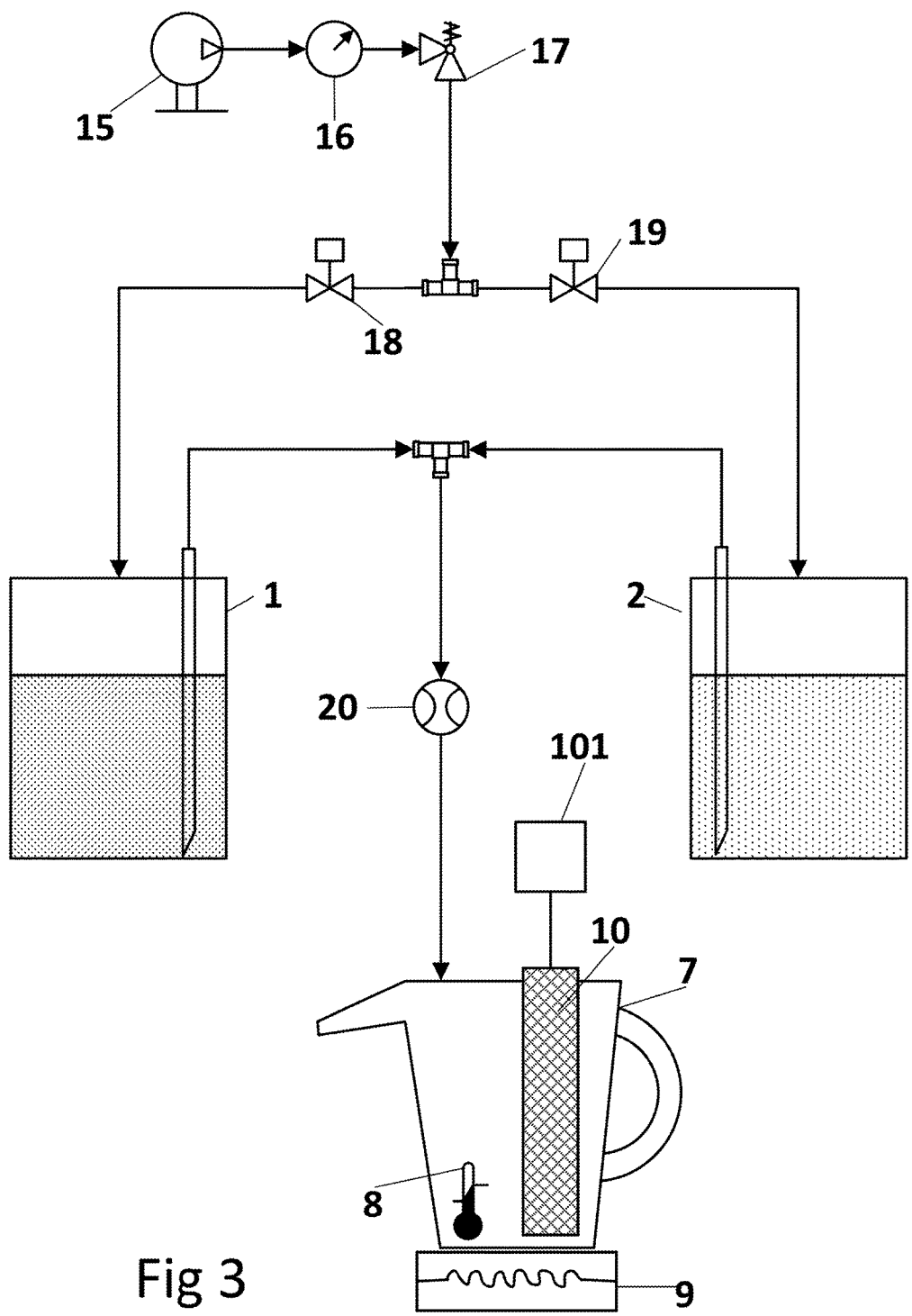
FIG. 3 shows an abridged general view of the structure of a liquid and gas circuit of a second embodiment of a chai brewing system, according to this disclosure.

The structure of the liquid and gas circuit of another embodiment of a chai brewing apparatus is shown in FIG. 3, wherein the trend of air flow, water flow, and milk flow is shown with arrows. A water container 2, a milk container 1, a flowmeter 20, a heating element 9, a brew pot 7, a mesh filter 10, a mesh filter retracting mechanism 101, and a water-milk output switching mechanism may be arranged in the shell of the chai brewing apparatus. The water-milk output switching mechanism may include a gas pump 15, a pressure sensor 16, a pressure relief valve 17, a first air valve 18, and a second air valve 19. Milk container 1 and water container 2 may be hermetically sealed. First air valve 18 may connect the milk container 1 to the gas pump 15, and second air valve 19 may connect the water container 2 to the gas pump 15. When first air valve 18 is closed and second air valve 19 is open, gas pump 15 may pressurize water container 2. When the pressure inside the water container 2 is above the hydraulic head required to displace the water into brew pot 7, the water may start flowing into brew pot 7. The quantity of water dispensed may be monitored by flowmeter 20. The pressure sensor 16 may monitor pressure, and controller 13 may stop operation if the pressure rises beyond the safety specifications of the apparatus. Pressure relief valve 17 in the air circuit can be used, which may relieve air pressure if it rises beyond the safety specification. Alternatively, both pressure sensor 16 and pressure relief valve 17 can be used for redundancy. Similarly, when first air valve 18 is open, and second air valve 19 is closed, the gas pump 15 may pressurize milk container 1. When the pressure inside milk container 1 is above the hydraulic head required to displace milk intro brew pot 7, the milk may start flowing into brew pot 7.

The mixture of tea base, spices and sweeteners may be placed in the cylindrical shaped mesh filter 10, which may be attached to the mesh filter retracting mechanism 101. In other embodiments, the shape of mesh filter 10 can be non-cylindrical, with the mixture of tea base and spices contained within the mesh filter and immersed in the liquid mixture inside brew pot 7. The controller 13 may activate the retracting mechanism 101, which can be a solenoid, a lead screw-motor combination, or any other conventionally used linear displacement mechanism, to retract mesh filter 10 after the chai brew process is complete so that the intensity of the chai is kept stable.

Figure 4:
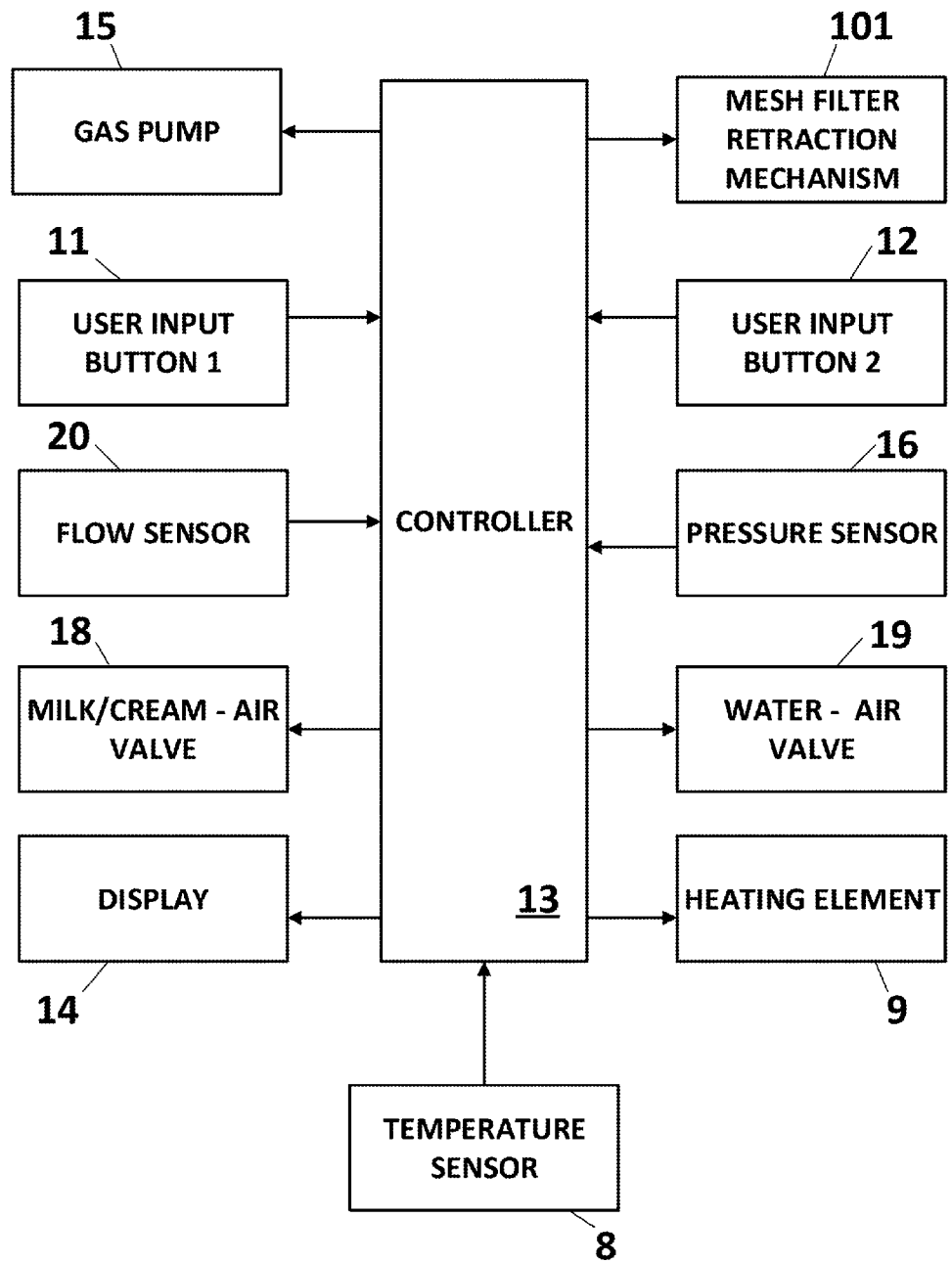
FIG. 4 shows an abridged general view of a circuit box structure of the embodiment of FIG. 3.

The circuit box structure of the FIG. 3 embodiment is shown in FIG. 4: the data collection ports of the controller 13 may accept the liquid flow signal from flow sensor 20, the liquid temperature signal of brew pot 7 from temperature sensor 8, the air pressure signal from pressure sensor 16, and the user inputs from the User Input buttons 11, 12. The control input of controller 13 may accept additional user inputs from additional buttons. The control output ports of the controller 13 may control milk air valve 18, water air valve 19, heating element 9, gas pump 15, mesh filter retraction mechanism 101, and display 14.

Embodiment 3

Figure 5:
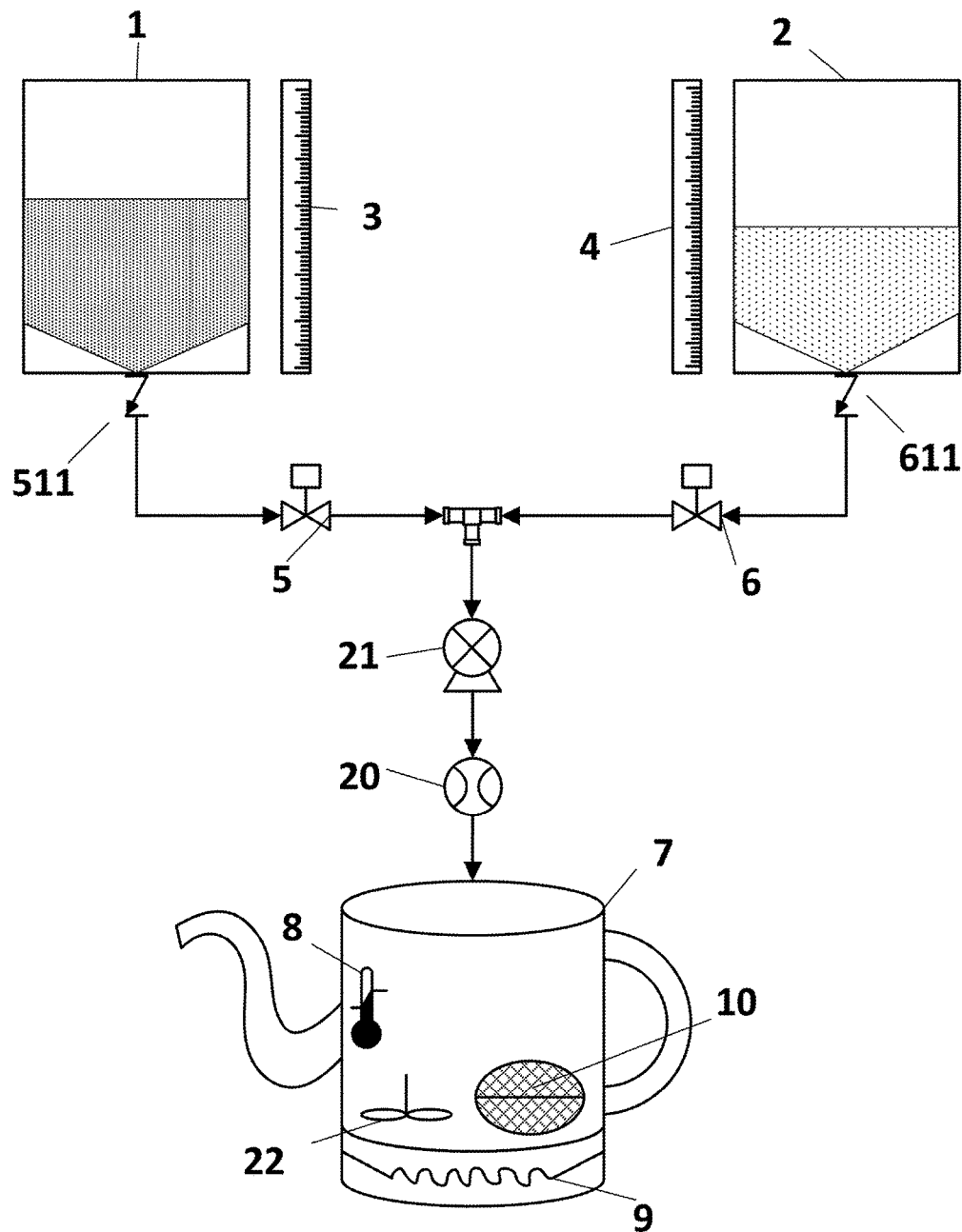
FIG. 5 shows an abridged general view of the structure of a liquid circuit of a third embodiment of a chai brewing system, according to this disclosure.

The structure of the liquid circuit of another embodiment of a chai brewing apparatus is shown in FIG. 5, wherein the trend of water and milk flow is shown with the arrows. A water container 2, a milk container 1, a water level sensor 4, a milk level sensor 3, a heating element 9, a brew pot 7, and water-milk output switching mechanism may be arranged in the shell of the chai brewing apparatus. The water-milk output switching mechanism may include a first valve 5 and a second valve 6, a hydraulic pump 21, which can be a gear pump, centrifugal pump, syringe pump, or any other conventionally used liquid pump, and a flowmeter or flow sensor 20. Hydraulic pump 21 may pump water into brew pot 7 when valve 6 is open and valve 5 is closed and may pump milk into brew pot 7 when valve 5 is open and valve 6 is closed. The quantity of the liquid dispensed may be controlled by signals from flowmeter 20 or level sensors 3, 4, or a combination of both.

The heating element 9 may be integrated into brew pot 7. The advantages of integrating the heating element may include increasing safety, as the hot surface is not exposed, and keeping the chai warmer/hot longer, even when brew pot 7 is removed from the apparatus for serving. All the external surfaces, even the bottom surface, of brew pot 7 may be insulated from inside to minimize the temperature rise of the surface and heat loss. A stirrer 22 can be integrated into the brew pot 7, which may keep stirring the mixture of liquids continuously or intermittently, as needed. The mixture of tea base, spices, and sweeteners may be placed in mesh filter 10, which may have an oval or oblong shape. Mesh filter 10 may rest inside brew pot 7. As milk and water flow into brew pot 7, the filter 10 may become immersed in the liquid mixture inside the brew pot 7.

Figure 6:
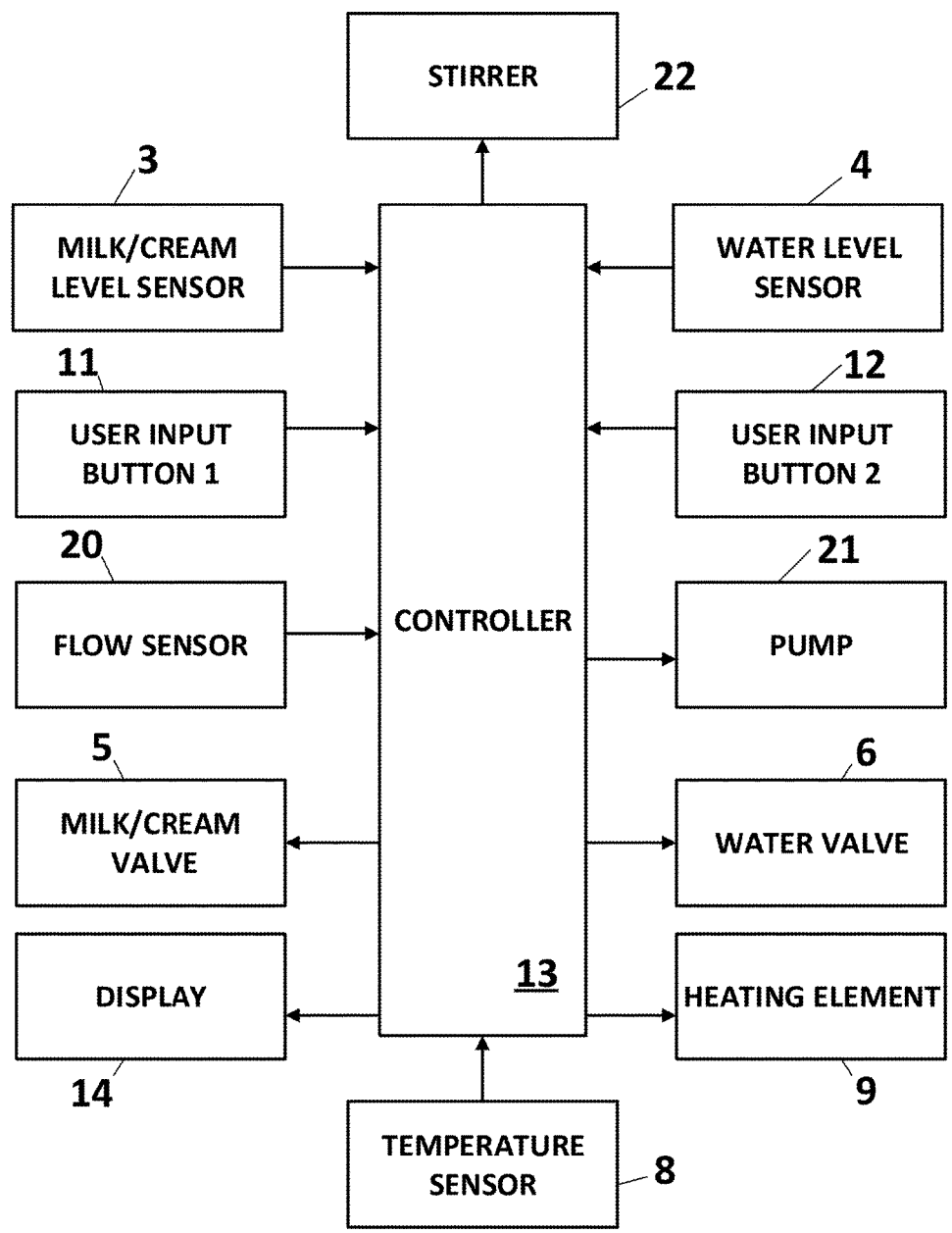
FIG. 6 shows an abridged general view of a circuit box structure of the embodiment of FIG. 5.

The circuit box structure of the FIG. 5 embodiment is shown in FIG. 6: the data collection ports of the controller 13 may accept the water level signal from water level sensor 4, the milk level signal from the milk level sensor 3, the liquid temperature signal of brew pot 7 from the temperature sensor 8, flow rate signal from flowmeter 20, and the user inputs from the User Input buttons 11, 12. The control output ports of the controller 13 may control water valve 6, milk valve 5, heating element 9, display 14, hydraulic pump 21, and stirrer 22.

Figure 7:
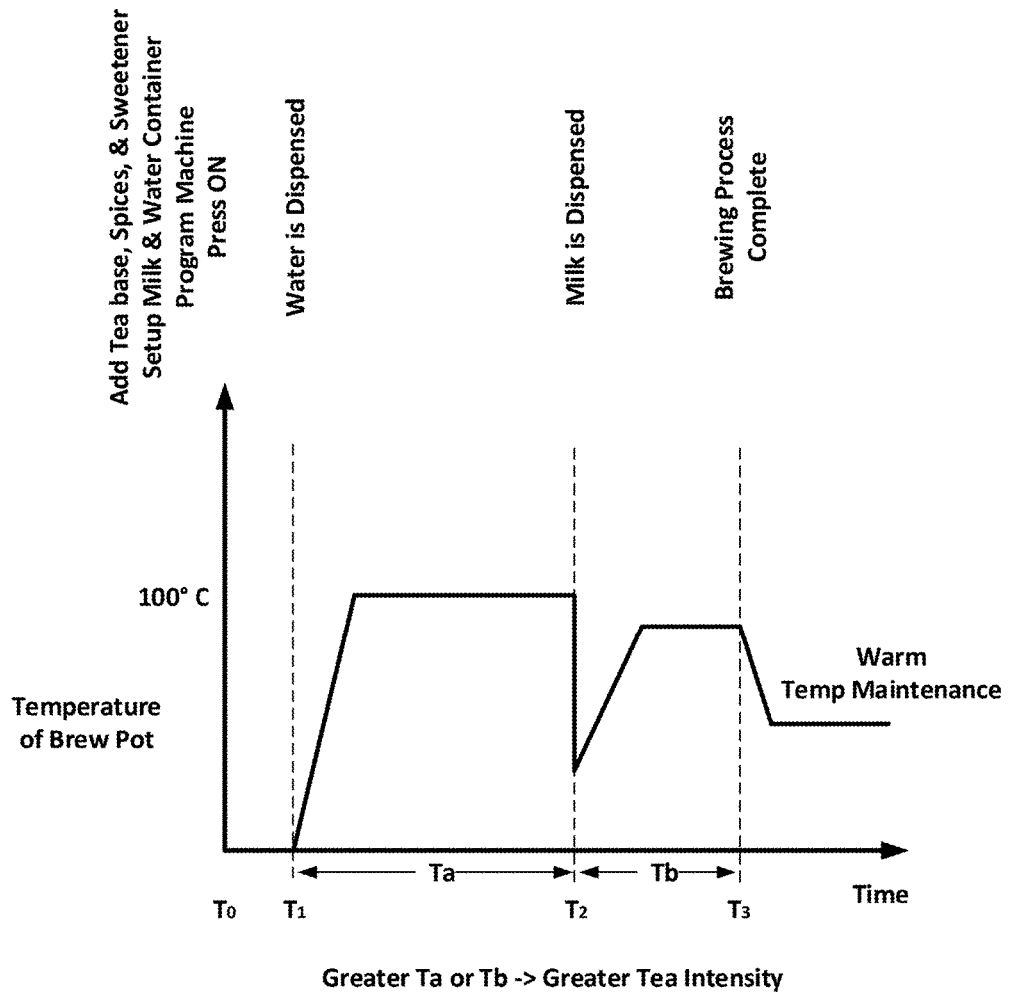
FIG. 7 shows a graph illustrating the relationship between time, temperature, and liquid dispensing during a brewing process, according to an exemplary embodiment.

FIG. 7 illustrates a brewing process that may be followed by any of the chai brewing apparatuses described herein. Start time $T_0$ may represent any time before first time $T_1$. A number of steps may take place before first time $T_1$. For example, tea base, spices, and sweetener may be added to the brew pot 7. These ingredients may or may not be placed within a filter 10. Milk and water may be added to their respective milk and water containers. The brewing apparatus may be programmed, which may include programming before reaching the user and/or programming conducted by the user. For example, the user may program the brewing apparatus by inputting various user parameters, as described herein. The user may turn the machine on.

At a first time $T_1$, water may be dispensed from water container 2 into brew pot 7. First time $T_1$ may be any amount of time from $T_0$ or may be a preset time of day. For example, first time $T_1$ may be 30 minutes from $T_0$, 1 hour from $T_0$, or 7 am. The controller 13 may open the appropriate valves, as described above, to allow the water to flow into the brew pot 7. The controller 13 may then control the heating element 9 to heat the mixture (including the water) in brew pot 7 to a first temperature. The first temperature may be predefined by the user and/or programmed into a brewing algorithm and stored by the controller 13. In one example, the water mixture may be heated to 100° Celsius. The water mixture may remain at the first temperature until second time $T_2$.

$T_2$ may be a time that is an interval $T_a$ from first time $T_1$. In one example, the interval $T_a$ may be between 5-10 minutes. At second time $T_2$, milk may be dispensed from milk container 1 into brew pot 7. The controller 13 may open the appropriate valves, as described above, to allow the milk to flow into the brew pot 7. The controller 13 may then control the heating element 9 to heat the mixture (including the milk) to a second temperature, which may be predefined by the user and/or programmed into a brewing algorithm and stored by the controller 13. In one example, the second temperature may be less than the first temperature. The second temperature, for example, may be between 85-95 degrees Celsius. The milk mixture may then be kept at the second predefined temperature until a third time $T_3$, when the brewing process is complete.

The third time $T_3$ may be a time that is an interval $T_b$ from the second time $T_2$. In one example, the interval $T_b$ may be between 3-10 minutes. The temperature of the liquid combination may then be reduced, by reducing the heat of the heating element 9, to a third temperature, which also may be predefined by the user and/or programmed into a brewing algorithm and stored by the controller 13. In one example, the third temperature may be less than the second temperature. In one example, the third temperature may be between 50-75 degrees Celsius. The tea may be maintained at the third temperature for a period of time that also may be defined by the user. In one example, if the controller 13 has not been programmed with a specific third temperature, the heating element 9 may be turned off by the controller 13 at third time $T_3$. In this example, the controller 13 is programmed to begin decreasing the temperature of the liquid combination by turning the heating element 9 off. Accordingly, the temperature of the liquid combination may begin to decrease towards a temperature of the room or surroundings in which the brew pot 7 is located, and the third temperature may be the temperature of the room/surroundings.

In one example, when the user selects a desired intensity of tea, the algorithm stored by the controller 13 modifies the intervals $T_a$ and $T_b$ to adjust the resulting tea intensity. For example, a longer $T_a$ and/or a longer $T_b$ may result in a tea having a higher intensity. Accordingly, the user may input a desired intensity on a user-friendly scale (e.g., 1-5 or 1-10) and the systems described herein may lengthen at least one of $T_a$ or $T_b$ to achieve a higher intensity and shorten at least one of $T_a$ or $T_b$ (relative to the high-intensity intervals) to achieve a lower intensity tea.

In one example, after water is dispensed at time $T_1$, the temperature of the water mixture may increase at a constant rate during a first portion of interval $T_a$. For a second portion of interval $T_a$, the water mixture may remain at a constant temperature. After the milk is dispensed at time $T_2$, the temperature of the liquid mixture may increase at a constant rate for a first portion of interval $T_b$, then may remain at a constant temperature for a second portion of interval $T_b$. After time $T_3$, the temperature of the liquid mixture may decrease at a constant rate. Then the liquid mixture may remain at a constant temperature.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

I claim:

1. An automatic tea brewing system, comprising:
a first container configured to hold a first liquid;
a second container configured to hold a second liquid;
a brew pot fluidly coupled to the first container and to the second container;
tea leaves positioned in the brew pot for brewing tea when the brew pot is heated;
a first valve in fluid connection with an outlet of the first container and an inlet of the brew pot, the first valve having an open configuration to permit a flow of the first liquid from the first container to the brew pot and a closed configuration that does not permit the flow of the first liquid from the first container to the brew pot; and
a second valve in fluid connection with an outlet the second container and the inlet the brew pot, the second valve having an open configuration to permit a flow of the second liquid from the second container to the brew pot and a closed configuration that does not permit the flow of the second liquid from the second container to the brew pot;
wherein the system is configured to have the first valve in the open configuration of the first valve to dispense the first liquid from the first container to the brew pot at a first time, to then heat the first liquid in the brew pot to a first temperature, to then have the second valve in the open configuration of the second valve to dispense the second liquid from the second container to the brew pot at a second time later than the first time to produce a liquid mixture of the first liquid and the second liquid in the brew pot with the tea leaves, to then heat the liquid mixture in the brew pot to a second temperature, and, at a third time later than the second time, to then decrease the temperature of the liquid mixture.

2. The automatic tea brewing system of claim 1, wherein a bottom face of each of the first and second containers includes a drain hole and at least one of an incline or a curvature to facilitate draining of liquid through the drain hole.

3. The automatic brewing system of claim 1, wherein the system does not require an operator to dispense the first and second liquids into the brew pot during a brewing process.

4. The automatic brewing system of claim 1, further comprising a partially permeable material to separate the tea leaves from the liquid mixture.

5. The automatic brewing system of claim 1, wherein the system includes a pump to dispense the first and second liquids into the brew pot.

6. The automatic brewing system of claim 1, further comprising at least one of (a) a liquid level sensor to measure a quantity of one or both of the first liquid dispensed and the second liquid dispensed, and (b) a flow sensor to measure a quantity of one or both of the first liquid dispensed and the second liquid dispensed.

7. The automatic brewing system of claim 1, wherein the system is configured to store a profile that includes a combination of user parameters.

8. The automatic brewing system of claim 1, wherein the system is configured to have the second valve in the closed configuration of the second valve when the first valve is in the open configuration of the first valve, and the system is configured to have the first valve in the closed configuration of the first valve when the second valve is in the open configuration of the second valve.

9. An automatic tea brewing system, comprising:
a first container configured to hold a first liquid;
a second container configured to hold a second liquid;
a brew pot fluidly coupled to the first container and to the second container;
tea leaves positioned in the brew pot for brewing tea when the brew pot is heated, wherein the brew pot includes a partially permeable material to filter the tea leaves from brewed tea;
a first valve in fluid connection with an outlet of the first container and an inlet of the brew pot, the first valve, when open, permitting a flow of the first liquid from the first container to the brew pot and, when closed, not permitting the flow of the first liquid from the first container to the brew pot;
a second valve in fluid connection with an outlet the second container and the inlet the brew pot, the second valve, when open, permitting a flow of the second liquid from the second container to the brew pot and, when closed, not permitting the flow of the second liquid from the second container to the brew pot; and
a user input feature for a user to input parameters, the parameters being used by the system to control brewing tea, wherein brewing tea by the system includes opening the first valve to dispense the first liquid from the first container to the brew pot at a first time, then heating the first liquid in the brew pot to a first temperature, then opening the second valve to dispense the second liquid from the second container to the brew pot at a second time later than the first time to produce a liquid mixture of the first liquid and the second liquid in the brew pot with the tea leaves, and then heat the liquid mixture in the brew pot to a second temperature less than the first temperature.

10. The automatic brewing system of claim 9, wherein the parameters are data inputs to a data collection port of a controller.

11. The automatic brewing system of claim 9, wherein the parameters include one or more of relative amounts of the first liquid and the second liquid, a number of cups of brewed tea, an intensity of the brewed tea, a time delay before starting brewing tea, a time to start brewing tea, a time to keep the brewed tea hot, and a desired serving temperature of the brewed tea.

12. An automatic tea brewing system, comprising:
a first container to hold water, a second container to hold milk, and a plurality of valves; and
a brew pot fluidly coupled to the first container and to the second container;
tea leaves positioned in the brew pot for brewing chai tea, wherein the brew pot includes a partially permeable material to filter the tea leaves from brewed tea;
wherein the plurality of valves are in fluid connection with the first container and the second container to control a flow of the water and a flow of the milk to the brew pot, so that a first valve of the plurality of valves causes the water to flow from the first container to the brew pot at a first time for heating in the brew pot to a first temperature, and a second valve of the plurality of valves causes the milk to flow from the second container to the brew pot at a second time later than the first time to produce a liquid mixture of the water and the milk in the brew pot with the tea leaves for heating to a second temperature less than the first temperature.

13. The automatic brewing system of claim 12, further comprising a controller having data collection ports and control output ports, the controller in communication with the valves to control the valves.

14. The automatic brewing system of claim 12, wherein the partially permeable material is a filter.

15. The automatic brewing system of claim 12, wherein the first valve is in fluid connection with an outlet of the first container and an inlet of the brew pot, the first valve having an open configuration to permit the flow of the water from the first container to the brew pot and a closed configuration that does not permit the flow of the water from the first container to the brew pot, and wherein the second valve is in fluid connection with an outlet the second container and the inlet the brew pot, the second valve having an open configuration to permit the flow of the milk from the second container to the brew pot and a closed configuration that does not permit the flow of the milk from the second container to the brew pot.

* * * * *